United States Patent
Marolia et al.

(10) Patent No.: US 9,747,191 B1
(45) Date of Patent: Aug. 29, 2017

(54) TOOL TO REPLICATE ACTIONS ACROSS DEVICES IN REAL TIME FOR IMPROVED EFFICIENCY DURING MANUAL APPLICATION TESTING

(71) Applicant: Amazon Technologies, Inc., Seattle, WA (US)

(72) Inventors: Faizaan Kersi Marolia, Bangalore (IN); Sai Krishna Kuppaiah, Vellore (IN); Piyush Aggarwal, Bangalore (IN); Utsav Jain, Bengalaru (IN); Deepikaa Suresh, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/875,471

(22) Filed: Oct. 5, 2015

(51) Int. Cl.
| G06F 9/44 | (2006.01) |
| G06F 11/36 | (2006.01) |
| H04L 29/08 | (2006.01) |
| G06F 3/0484 | (2013.01) |
| G06F 11/34 | (2006.01) |
| G06F 9/445 | (2006.01) |

(52) U.S. Cl.
CPC ........ *G06F 11/3664* (2013.01); *G06F 3/0484* (2013.01); *G06F 9/44589* (2013.01); *G06F 11/3466* (2013.01); *H04L 67/1095* (2013.01)

(58) Field of Classification Search
CPC ............. G06F 11/3664; G06F 11/3466; G06F 9/44589
USPC .................................................. 717/124–127
See application file for complete search history.

(56) References Cited

U.S. PATENT DOCUMENTS

| 5,335,342 | A | * | 8/1994 | Pope | ................... | G06F 11/3672 |
| | | | | | | 714/38.13 |
| 5,758,062 | A | * | 5/1998 | McMahon | .......... | G06F 11/3688 |
| | | | | | | 714/33 |
| 6,167,534 | A | * | 12/2000 | Straathof | ............ | G06F 11/3414 |
| | | | | | | 714/38.1 |
| 7,627,821 | B2 | * | 12/2009 | Klementiev | ........ | G06F 9/45512 |
| | | | | | | 715/704 |
| 8,219,671 | B2 | * | 7/2012 | Creamer | ............. | G06F 11/3684 |
| | | | | | | 709/202 |
| 8,984,513 | B2 | * | 3/2015 | Bergheaud | .......... | G06F 11/2097 |
| | | | | | | 718/101 |
| 9,405,665 | B1 | * | 8/2016 | Shashi | ................ | G06F 11/3688 |
| 2005/0278728 | A1 | * | 12/2005 | Klementiev | ........ | G06F 9/45512 |
| | | | | | | 719/328 |
| 2006/0010426 | A1 | * | 1/2006 | Lewis | ................. | G06F 11/3684 |
| | | | | | | 717/124 |
| 2006/0259542 | A1 | * | 11/2006 | Wu | ......................... | H04L 69/02 |
| | | | | | | 709/202 |
| 2007/0240118 | A1 | * | 10/2007 | Keren | ................. | G06F 11/3684 |
| | | | | | | 717/124 |

(Continued)

*Primary Examiner* — Phillip H Nguyen
(74) *Attorney, Agent, or Firm* — Patterson + Sheridan, LLP

(57) ABSTRACT

Embodiments presented herein provide techniques for evaluating for dynamically testing an application or "app" on multiple computing devices at the same time. Each device participating in a testing session runs a device agent which monitors and records user input directed to the app on that device. When a user input event occurs is directed to the app on one of the devices, the corresponding device agent translates the user input into replication events that can be broadcast to, and then replayed by, the app on the other computing devices participating in the testing session.

20 Claims, 10 Drawing Sheets

(56) References Cited

U.S. PATENT DOCUMENTS

| | | | | |
|---|---|---|---|---|
| 2008/0243572 A1* | 10/2008 | Amos | ................ | G06Q 30/0201 |
| | | | | 705/7.29 |
| 2011/0004868 A1* | 1/2011 | Bharadwaj | .......... | G06F 11/3676 |
| | | | | 717/135 |
| 2011/0029956 A1* | 2/2011 | Ledenev | ............. | G06F 11/3696 |
| | | | | 717/125 |
| 2011/0191676 A1* | 8/2011 | Guttman | ................. | G06F 3/048 |
| | | | | 715/716 |
| 2012/0084684 A1* | 4/2012 | Kota | ................... | G06F 11/3672 |
| | | | | 715/762 |
| 2014/0331211 A1* | 11/2014 | Ma | ...................... | G06F 11/3688 |
| | | | | 717/131 |
| 2016/0246708 A1* | 8/2016 | Sabag | ................ | G06F 11/3664 |

* cited by examiner

TOOL TO REPLICATE ACTIONS ACROSS DEVICES IN REAL TIME FOR IMPROVED EFFICIENCY DURING MANUAL APPLICATION TESTING

Embodiments presented herein relate to computer software testing. More specifically, embodiments presented herein provide a test platform that captures user input events for an application under test on one device and replicates the events to instances of the application running on a collection of other devices.

Applications or "apps" generally refers to computer software which can run on a variety of computing devices. In addition to desktop or laptop computing systems, apps are available for a variety of computing devices including mobile phones, computing tablets, video game consoles, digital media players, television display panels, etc. Apps are commonly distributed through online distribution services, which allow users to download and install apps to a given computing device. For example, an "app store" may be used to distribute apps related to social media, productivity, health and fitness, streaming video, games, commerce, image editing, to name just a few.

While these online distribution services are a popular and effective way to distribute apps, it can be difficult for the provider of an app store to ensure the quality, reliability, and sometimes even the legitimacy of a given app, given the large number of apps developed for some devices. For example, a consumer electronics enterprise may design and build both computing tablets and mobile phone devices which run a common operating system (OS) platform. In addition to apps published by the enterprise, third party developers may build apps for the mobile phones and tablets distributed via the enterprise's online distribution platform. Further, the enterprise may provide an ingestion process which allows third-party developers to submit an app to be published to the online "app store."

As part of the ingestion process, a test engineer may manually evaluate the functionality (or other aspect) of a submitted app before it is released as a part of a live catalog. As problems are found, the evaluation may be used to provide feedback to a developer. However, as the number of different devices and operating systems grows (and versions or releases of the same device and/or OS), manually testing each app (and release of each app) on every supported platform becomes impractical at best.

Currently, app testing for mobile devices is typically performed using a software emulator to simulate a given hardware device, e.g., to simulate a mobile phone running a version of a mobile device OS. The emulator can be used to carry out tests to validate a set of requirements or identify errors or bugs. However, this approach often fails to identify issues that arise from user input mechanisms while a user interacts with an app (e.g., while a user performing gestures on a touch screen). Further, this approach relies on the quality of the emulator to replicate the behavior of the replicated devices and typically requires a test engineer to interact with an emulator for each device, hardware version, OS version, and app version individually.

DETAILED DESCRIPTION

Figure 1:
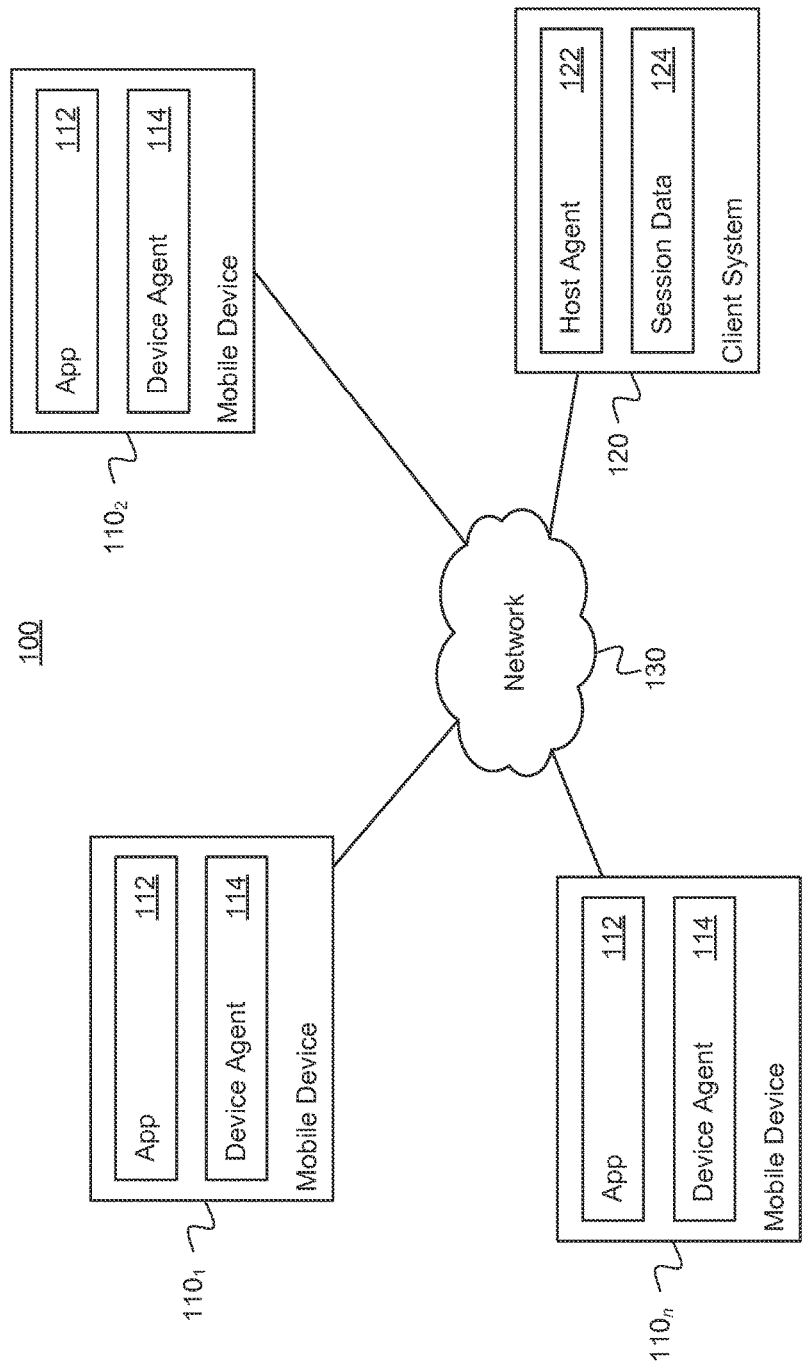
FIG. 1 illustrates an example of a computing environment used to replicate user input events performed on one device to others as part of application testing, according to one embodiment.

Embodiments presented herein provide a platform used to dynamically test a software application or "app" across a collection of computing devices such as mobile phones, computing tablets, and other devices which can install apps via an online distribution service or "app store." As described below, the platform facilitates event capture and simulation across a variety of different computing devices and device configurations in real-time, while capturing artifacts such as memory, CPU, screenshots, network, traces, log data, and tags (e.g., identifying a test case, observations made by a test engineer, a root cause or problem along with other test details input by a test engineer).

In one embodiment, the platform captures the actions of a test engineer in interacting with the app on one of the devices and replicates user input events to an instance of the app running on each of the other computing devices. To do so, each device participating in a replication session runs a device agent which monitors and records user input directed to the app on that device. When the test engineer interacts with the app on one of the devices, the corresponding device agent translates the user input into replication events that can be broadcast to, and then replayed by, the app on the other computing devices participating in the replication session.

In one embodiment, the device agent may include an event recording component and an event replay component. The event recording component may monitor a hardware input stream to identify low level hardware events generated while the test engineer interacts with the app under test on one of the computing devices. Further, the event recording component may access services provided by an operating system (OS) on a given device to translate the low level hardware events into user input gestures, e.g., to translate a sequence of screen touches into a swipe or to identify characters typed on keyboard rendered on a touch screen. That is, rather than attempt to directly translate or coalesce the stream of hardware events into user input events (e.g., gestures), the event recording component relies on the same services the OS uses to translate hardware events into user input on the computing device. Doing so provides a highly accurate capture of events on one of the computing devices to replicate on the other computing devices participating in a replication session. In turn, the event replay component replicates user input events on each computing device participating in the replication session by triggering or simulating the same user input event messages generated for the app under control of the test engineer. In addition, the event replay component may capture data related to memory or CPU utilization, screenshots, network, traces, log data, and any tags or comments provided by a test engineer. Doing so may help provide feedback to an app developer regarding the performance of an app on a given hardware device. The recording component may also register with an accessibility protocol provided by the OS on the computing device to receive notifications of changes to the state of certain user interface components.

In one embodiment, a host agent may be used to coordinate the activity of a replication session, as well as receive and report on the metrics recorded by device agent on the computing devices participating in the replication session. For example, the host agent may be configured to broadcast events generated by an app under control of the test engineer on one computing device to the other devices participating in the replication session. The host agent may be implemented as a standalone application running on a local computing system used by the test engineer or as a web service accessed using a browser. Further, embodiments presented herein may be extended to support a batch re-run of recorded events to support automated functionality testing during new device launches and app version updates as well as replayed on virtualized devices. Similarly, a batched session of replay events may be replayed on multiple apps based on a common template.

Advantageously, embodiments described herein provide an effective and efficient tool for dynamically testing an app on multiple computing devices in real time. Further, because the device agent may rely on services provided by the device OS to identify and translate user input events, the platform does not require special privileges or access to a device under test or require any modification of the app being tested or simulated. The platform also provides high accuracy for event replication and broad event coverage (i.e., the range of user input that can be replicated), as well as accurately tests the performance of an app on multiple devices. In addition, the platform does not require any one particular device participating in a replication session to act as a "master" or "lead" device. Instead, events input by a test engineer to any of computing devices participating in a replication session are replicated to all the other devices in that session.

Note, certain embodiments of the invention are described below using a mobile device running a version of the Android® operating system as a reference example of device running an app under test. As known, Android is a mobile operating system (OS) based on the Linux® kernel which has been adapted for a broad variety of mobile telephones, handheld computing devices, computing tablets, etc. However, one of ordinary skill in the art will recognize that embodiments of the test platform described herein may be adapted for use with a variety of other operating systems and hardware devices.

FIG. 1 illustrates an example of a computing environment 100 used to replicate user input events performed on one device to others as part of application testing, according to one embodiment. As shown, the computing environment 100 includes a collection of mobile devices $110_{1-n}$ and client system 120, each connected to a network 130 (e.g., the internet or a local enterprise network). Client system 120 is included to be representative of a general purpose computing system, such as a desktop or laptop computer hosting software components of the test platform disclosed herein.

As shown, the client system 120 includes a host agent 122 and session data 124. Host agent 122 generally provides software used to distribute, install, and launch a set of on-device daemons (i.e., a device agent 114) on the mobile devices $110_{1-n}$. The host agent 122 may generally serve as a console used by a test engineer to monitor and control a replication session. For example, the host agent 122 may identify what mobile devices 110 are participating in a replication session as well as identify an app launched for purposes of testing on such devices. In one embodiment, the host agent 122 allows a test engineer to join (or remove) a mobile device 110 from a replication session, as well as toggle replication on the mobile devices $110_{1-n}$ during the replication session.

Session data 124 generally corresponds to data received from the device agents 114 during a replication session. For example, session data 124 may include memory usage data, CPU utilization, screenshots, network data, traces, and log data received from the device agents 114. Session data 124 may also include tags applied to user input or device events (e.g., identifying a metadata related to a test case, a root cause, problem, event, along with any other observations made by a test engineer). For example, the host agent 124 may be used to tag specific events that occur while testing an app as well as to report or comment on findings while evaluating an app 112.

Mobile devices $110_{1-n}$ are included to be representative of a variety of computing devices which can download and execute software applications or "apps," including, e.g., mobile phones, computing tablets, video game consoles, digital media players, television display panels, etc. As shown, mobile devices $110_{1-n}$ each include an instance of an app 112 under test and a device agent 114. In one embodiment, each device agent 114 provides an on-device daemon installed on the corresponding mobile device 110. Each device agent 114 may generally be configured to capture, log, and replay user input events. For example, when a test engineer interacts with app 112 on device $110_1$, the corresponding device agent 114 identifies what input events have occurred (e.g., a tapping of a button, a click and drag of an object across a screen, a touch-screen gesture, or text input entered on a keyboard). Note, for convenience, when discussed in context of events performed by a test engineer on a mobile device 110, the device may be referred to as an event originating device. Once identified, the device agent 114 on device $110_1$ sends a message to the host agent 122 on client system 120. The host agent 122 may then broadcast a message to the device agent 114 on mobile device $110_2$ and $110_n$. In turn, the device agent 114 on mobile device $110_2$ and $110_n$ each replay the event on the corresponding app 112. Note, for convenience, when discussed in context of replaying events performed on other devices, the device 110 may sometimes be referred to as a target device. As part of capturing and replaying events on a target device, the device agent 114 on each mobile device $110_{1-n}$ may capture screenshots, record performance metrics, report on any exceptions that occur (e.g., an app 112 crashing or reporting other errors), and record any tags or comments provided by the test engineer, all of which may then be transmitted to the host agent 122 as part of the session data 124 recorded for a replication session.

Figure 2:
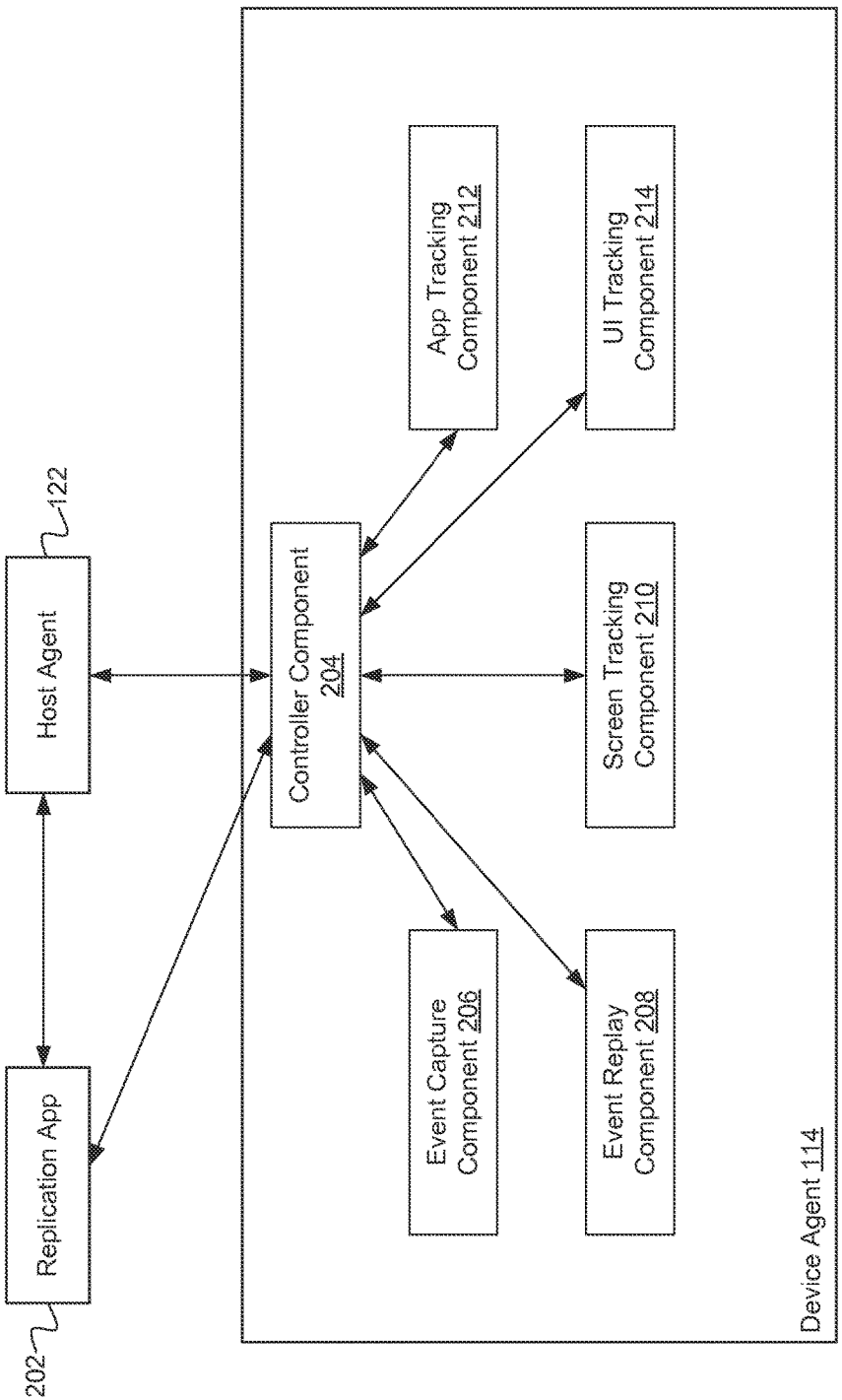
FIG. 2 illustrates components of a device agent installed on a mobile computing device as part of application testing, according to one embodiment.

FIG. 2 illustrates components of a device agent 114 installed on a mobile computing device 112, according to one embodiment. As shown, the device agent 114 includes a controller component 204, an event capture component 206, an event replay component 208, a screen tracking component 210, an app tracking component 212 and a user interface (UI) tracking component 214.

The event capture component 206 may generally be configured to capture and record user input events that occur on a mobile device while under the control of a test engineer. To do so, the event capture component 206 may use a variety of services provided by a mobile device OS, along with other mechanisms, to identify, capture, and interpret user input generated by a test engineer while testing an app on a mobile device.

In one embodiment, the event capture component 206 may register with a service provided by a mobile device OS which receives notifications of changes to the state of a user interface of an application (e.g., changes in the screen display presented by app 112). For example, the Android® operating system supports an accessibility service which runs in the background and receives notifications regarding changes to native user interface components. Such notifications may indicate, e.g., that a button has been clicked, the focus has been changed, text has been entered, or other user interface component in a view or hierarchy (a collection of user interface components) has transitioned from one state to another. Other mobile device operating systems may provide a comparable service. The event capture component 206 may register with the accessibility service to receive notifications of user input events, such as button clicks, text input, or click-and-drag events related to certain interface components (e.g., a scroll bar or volume control being controlled via a sliding puck). This approach allows the event capture component 206 to accurately capture the stream of user input events that results from a user interacting with certain native components supported by the mobile device OS.

The event capture component 206 may also identify events related non-native user interface components, e.g., gestures performed on a display screen rendering graphics data of a video game. To do so, the event capture component 206 may include a recorder that reads low-level hardware events from the OS and classifies the low-level events into more complex user interface actions, e.g., a swipe composed or long tap on a screen identified using a sequence of low-level hardware events. Again using the Android® operating system as an example, the event capture component 206 may read hardware events from objects in/dev/input and classify the events using a gesture classification API. The event capture component 206 may also identify other events that can occur while a test engineer interacts with an app under test that do not directly result from interactions with an application user interface. For example, the event capture component 206 may capture events that result in the hibernation of a device or app or system state events that result from a change in the orientation of a device (e.g., from portrait to landscape), or change the volume of a speaker, etc.

The event replay component 208 may generally be configured to replay user input events received from the host agent 122 (via the controller component 204). That is, the event replay component 208 may simulate or trigger user input events on an app under test. As described above, each event may correspond to user input performed on a first mobile device by a test engineer interacting with an app under test (and captured by the device agent 114 on the first mobile device). Just as the event capture component 206 may use a variety of mechanisms to capture different event types, the event replay component 208 may use different mechanisms to replay user input events which occurred on the first mobile device. For example, events may be injected as user input to an app on a second mobile device using an event generator mechanism supported by the mobile device OS hosting the app under test. The event generator may identify a native user interface component in a view of an app under test and inject an event to that component which simulates user input, e.g., an event of a screen touch at a directed to a button, changing the state of the button from being in un-pressed state to a pressed state.

In other cases, the event replay component 208 may use a screenshot of the app captured by the first device (which generated the event) to identify a matching object or region in a screen image of the app on the second device to replay user input, e.g., to replay a tap on a rendered character on on-screen button in a video game. Once matched, a gesture (or other user input) performed on the first device may be replayed for an app on the second device. Replaying events for non-native interface components may include normalizing or formatting the user input to account for differences in screen size, text settings, component position, etc., on the second device. For example, the length, starting position, and relative shape of a swiping gesture originally performed on a computing tablet may be adapted to account for the difference in size of a mobile telephone screen when replayed.

The screen tracking component 210 may generally be configured to capture screenshots of the display screen presenting a user interface of an app under test. In one embodiment, the screen tracking component 210 may continually maintain an in-memory screenshot (and recent history) of an app and user interface on a mobile device. Thus, instead of requiring advance knowledge that a manual user input event is going to occur, the screen tracking component 210 uses the in-memory screenshot to save a screen image as needed. Doing so allows the device agent 114 to capture a screenshot of an app under test both preceding and following a given user input event, as needed. The screen images captured during testing may be used to assist developers and test engineers in understanding what occurred during testing.

The UI tracking component 214 may generally be configured to track a current state (and recent history) of an application under test. For example, the UI component 214 may monitor the state of each user interface component associated with an app under test. To do so, the UI tracking comment 214 may monitor for changes in the state of a view, layout, or hierarchy describing each user interface component in the app, a state of each user interface component (e.g., visible, not visible, selected), relationships to other user interface components (e.g., where one view contains other components), and the layout of the user interface components. Doing so allows the event capture component 206 to associate a given user input event with a given user interface component by reference to a particular user interface component ID within a particular view and layout. Similarly, doing so allows the event replay component 208 and to identify the correct user interface component to use when replaying an event first performed on another mobile device during a replication session.

The app tracking component 212 may generally be configured to monitor for and detect failures, exceptions, or other errors triggered by an app under test. The tracking component 212 may also be configured to uploaded test artifacts to the host agent 122 (e.g., events, log data, performance metrics, screenshots, etc.) generated or captured by the other components of the device agent 114 during a replication session. The controller component 204 may generally be configured to orchestrate the activity of the event capture component 206, event replay component 208, screen tracking component 210, app tracking component 212 and UI tracking component 214. To do so, the controller component 204 may communicate with the host agent 122 and a replication app 202. In one embodiment, the device agent 114 runs as a service or daemon on a given mobile device in a generally transparent manner. That is, the operation of the device agent 114 may generally be hidden from a test engineer during application testing. Instead, the replication app 202 provides a front-end for the device agent 114 which allows a test engineer to start and stop a replication session for a given app under test as well as capture screenshots, tag events with metadata as needed to characterize application behavior during application testing.

Figure 3:
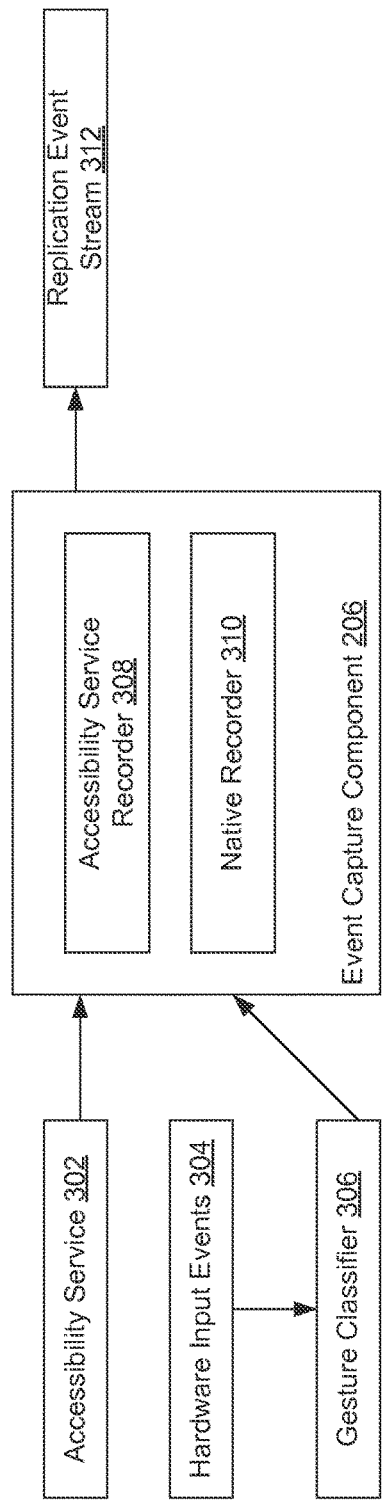
FIG. 3 further illustrates the event capture component first shown in FIG. 2, according to one embodiment.

FIG. 3 further illustrates the event capture component 206 first shown in FIG. 2, according to one embodiment. As shown, the event capture component 206 includes an accessibility service (AS) recorder 306 and a native recorder 310. The native event recorder 310 records hardware input events. The AS recorder 306 may generally configured to capture a specific group of user input event types performed by a test engineer while interacting with an app under test on a mobile device. The AS recorder 306 may register with an accessibility service 302 exposed by the mobile device OS to receive notifications related to changes in the state of certain types of user interface components. In one embodiment, the events captured by the AS recorder 306 may include tap events for native user interface components (e.g., a button in a view tapped by the test engineer or a native component selected by a tapping motion) and also include text input to a native interface component (e.g., a text box).

Like the AS recorder 306, the native recorder 310 may also be configured to capture a specific group of user input event types performed by a test engineer while interacting with a device under test. For example, the native recorder 310 may generally be configured to detect events by monitoring a low-level hardware event stream 304 (such as the/dev/input stream on an Android® device) and classifying the low-level events using a gesture classification API 305. In one embodiment, events captured by the native recorder 310 may include screen taps of a graphics object rendered on the user interface (i.e., a screen tap on a non-native component) a long press event, a double tap event, a swipe or scroll event, a flick event (i.e., a swipe performed at high velocity), a pinch or zoom event, a hibernate event, a volume change event, or a pan event (i.e., a hold and drag). Of course, the AS recorder 306 and native recorder 310 may be configured to capture a variety of other user interface events in addition to the distribution of events listed above. In addition, a device activity recorder may capture certain system events such as an orientation change on a mobile device or the hibernation of the device or a context switch to another device.

As events are captured by the AS recorder 306 and native recorder 310, the event capture component 206 may output a replication event stream 312 characterizing the user input events performed by the app under control of the test engineer. For example, a replication event may identify a user interface component within a layout of an app (e.g., a button in a particular view), the captured event (e.g., a screen tap event), the state of the interface component before and after the event (e.g., not pressed transitioned to pressed) and screenshots. As another example, for a text input event captured by the AS recorder 306, the event output to the replication event stream 312 may include the ID of the user interface component receiving the text input (and a position with in a layout and view of the component), the character added to the user interface component by the event, a screenshots of the interface, etc. Of course, the content of an event in the replication event stream 312 may be tailored as needed for the particular event captured by the AS recorder 306 or native recorder 310 or as needed to suit the needs of a particular case.

Figure 4:
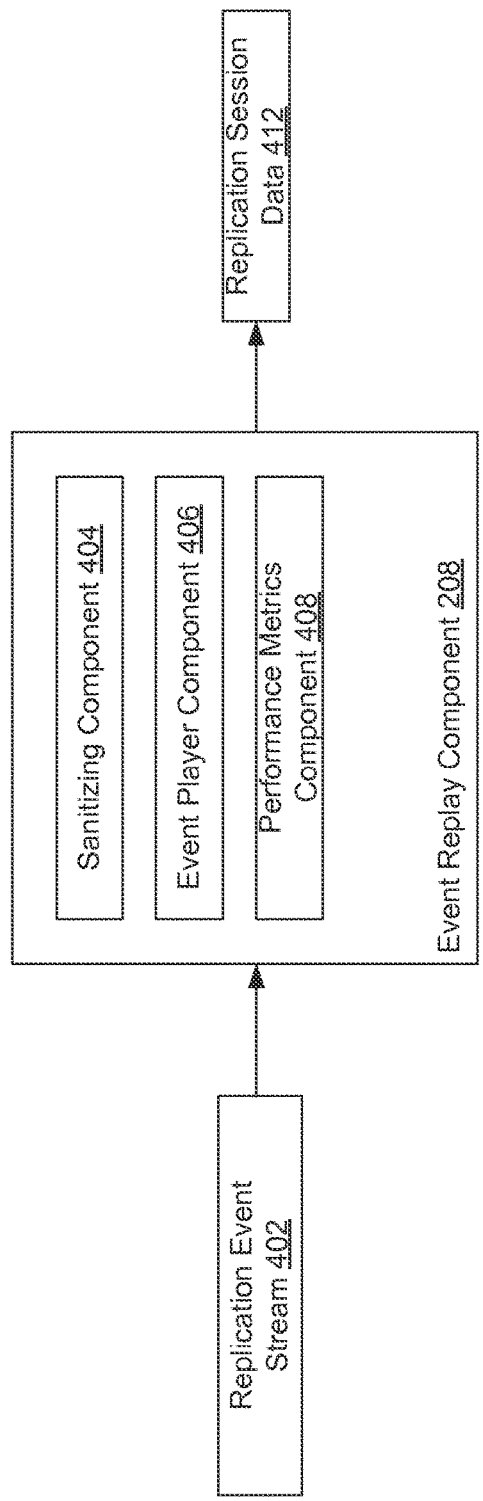
FIG. 4 further illustrates the event replay component first shown in FIG. 2, according to one embodiment.

FIG. 4 further illustrates the event replay component 208 first shown in FIG. 2, according to one embodiment. As shown, the event replay component 208 includes a screen sanitizing component 404, an event player component 406, and performance metrics component 408. As noted above, the event replay component 208 may generally replay each event initially performed on an event originating device participating in a replication session received by a target device via a replication event stream 402.

In one embodiment, the sanitizing component 404 may be configured to "sanitize" a device screen on a target device before the event player component 406 replays an event from the replication event stream 402. Doing so may address situations where certain events could independently occur on the target device in a manner which could disrupt a replication session or result in a divergence of application behavior or state of the app on the target device under test while replaying events received via the replication event stream 402. For example, the sanitizing component 404 may dismiss system pop-up dialogs (e.g., a message indicating a battery level is running low) or dismiss random advertising messages generated by an app under test on the target device. However, whether the sanitizing component 404 clears a dialog message on a target device before replaying an event from the event stream 402 may depend on the particular event to be replayed. For example, a "dismiss pop-up event" may be replayed on the target device without the sanitizing component 404 taking any action to clear any dialogs on the target device.

The event player component 406 may generally be configured to generate user input events directed to an app under test on a target device, based on the events in the replication event stream 402. For example, assume a tap event for a native interface component on the app under test is received via the replication event stream 402. In such a case, the event player generates a screen tap event directed to the app under test on the target device.

In one embodiment, the event player component 406 may parse an event received via the event stream 402 to identify a user interface component that is the subject of the event to be replayed on the target device and, in response, generate a user interface event directed to that component. In addition, the event replay component 208 may capture a screenshot of the app prior to replaying an event (e.g., by saving an instance of the in-memory screenshot maintained by the screen tracking component 210 captured just before after replaying the event). Depending on the event type, the event player component 406 may identify a user interface component or a location on the display screen of a device replaying events in order to replay a user input event. For example, for an event recorded by the AS recorder 306, the event player component 406 may identify the correct user interface component associated with the app under test on the target device based on a user interface component and a layout and view of the app on the event originating device. Once identified, an event is injected to the appropriate interface component on the target device. Alternatively, for some event types recorded by the native recorder 310, the event player component 406 may perform image processing to locate a scaled sub-image of a device screenshot on the target device to match with a sub-image of the user interface on the app on the event originating device. That is, the image processing is used to identify a position, size and orientation of the user interface displayed on the on the target device to direct user input performed by a test engineer while interacting with an app under test on the event originating device. Similarly, the event player component 406 could also perform any translation or mapping as needed to translate a given event performed on an event originating device in order to replicate that event on a target device. For example, in cases where the event originating device supported a certain touchscreen gesture that is not supported on the target device. In such a case, the event player component 406 could translate the unsupported gesture into a set of gestures supported on the target device in order to replay the user input represented by the unsupported gesture on the target device. Doing so would allow a test engineer to use specialized gestures or input controls (e.g., physical buttons or switches) on the event originating device that are not present on one or more of the target devices.

Further, in one embodiment, the player component 406 may validate whether an event is replayed successfully on a target device. The performance metrics component 408 may capture performance data while replaying events on the target device. For example the performance metrics component 408 may capture data related to memory or CPU utilization, screenshots, network data, object traces, or log data, etc., generated while replaying a given event. Data generated by the performance metrics component 408 may be exported by the replay component as replication session data 412.

Figure 5:
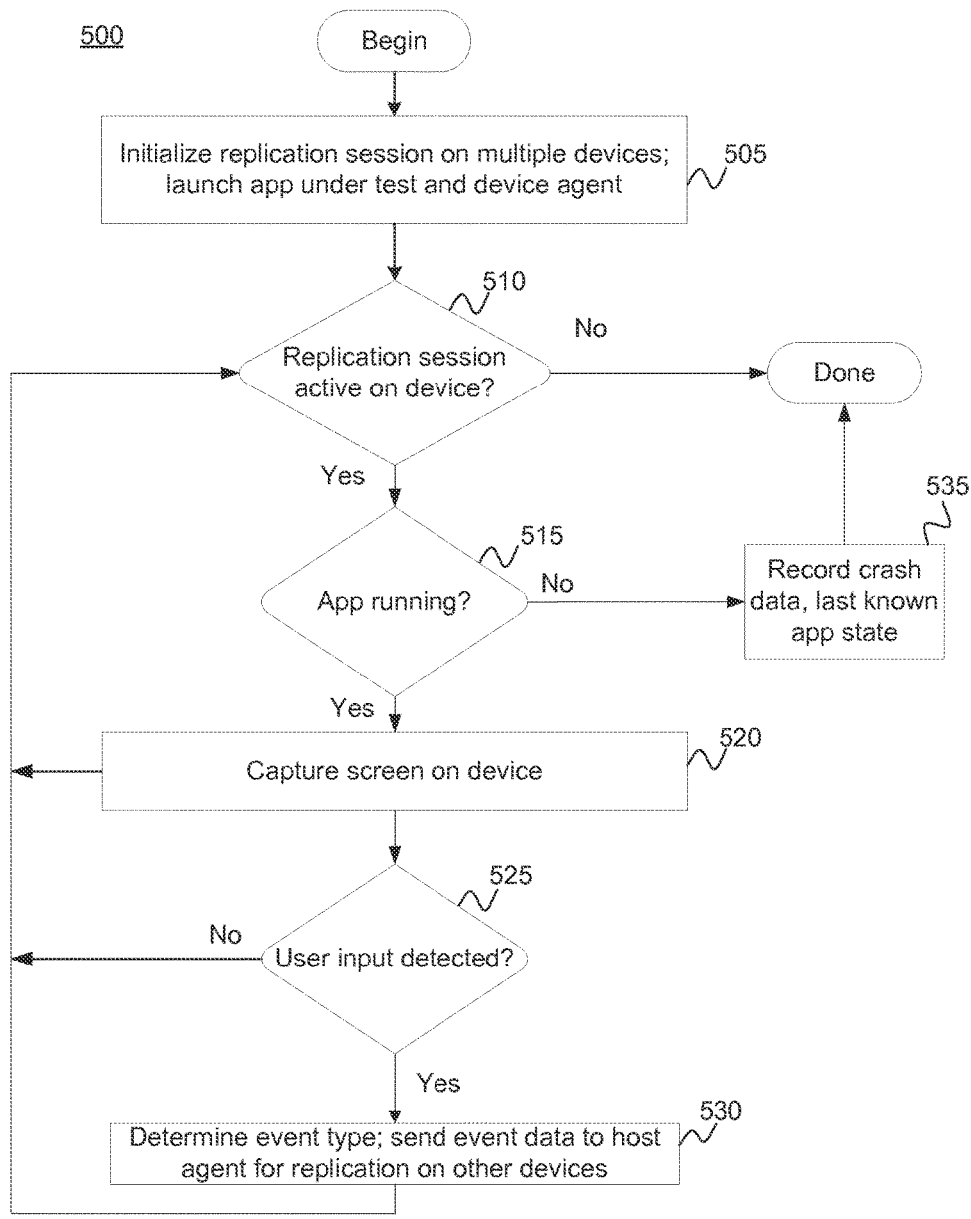
FIG. 5 illustrates a method for replicating user input events captured on one device to others as part of application testing, according to one embodiment.

FIG. 5 illustrates a method 500 for replicating user input events captured on an event originating device on a collection of target devices as part of application testing, according to one embodiment. As shown, the method 500 begins at step 505 where a replication session is initiated for an app under test on a collection of computing devices (e.g., mobile telephones and computing tablets, among others). As part of doing so, the app under test is launched on each device along with the device agent used to capture and replay events. In addition, the host agent discussed above may be used to join each mobile device to a common replication session and provide a console used by a test engineer to monitor and control the replication session.

At step 510, the device agent determines whether a replication session is active on that target device. While active, the device agent actively replicates events from the replication event stream 402 on that target device. Note, the loop initiated at step 510 may be performed independently by the device agent on each mobile device participating in the replication session. At step 515, the device agent determines whether the app under test is still running on the computing device. If not, e.g., where an exception has occurred or the app has otherwise been terminated, then the device agent records whatever crash data may be available along with a last known state of the app under test. For example, the device agent may record the last available screenshot of the app along with the last event successfully replayed (or performed or attempted) on the device prior to a crash or exception event.

Otherwise, while the app is running on the device, then the device agent updates the in-memory screenshot of the user interface displayed on the device. At step 525, the device agent determines whether any user input has occurred on the mobile device. As described above, for example, an accessibility service (AS) recorder may capture certain events via a notification service exposed by the OS of the mobile device and a native recorder may capture low-level hardware events and classify more complex user input events using a gesture classifier. If no manual user input events have occurred, then the device agent returns to step 515, determines whether the app under test is still running (step 515) and updates the in-memory screenshot of the user interface displayed on the device (step 520).

Otherwise, when a user input event is detected, then at step 530, the event capture component determines an event type, a user interface element type or location on the display screen to associate with the event, and sends event data to a host agent. In turn, the host agent broadcasts the event for replication on the other computing devices participating in the replication session initiated at step 505. Following step 530, the device agent again returns to step 510, determines whether the replication session remains active (step 510), whether the app under test is still running (step 515), updates the in-memory screenshot of the user interface displayed on the device (step 520), and determines whether any user input is detected (step 525).

Figure 6:
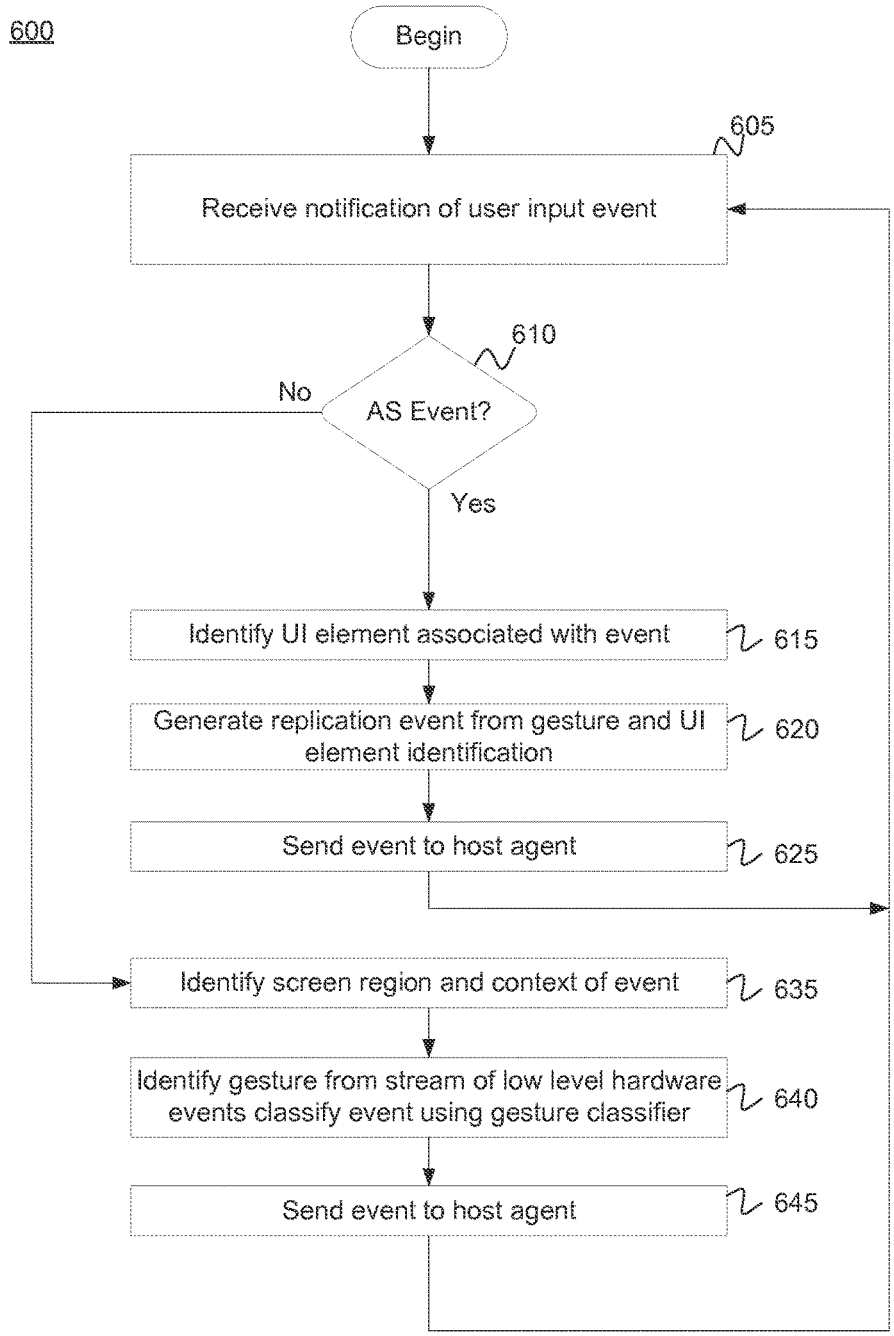
FIG. 6 illustrates a method for capturing and recording user input events on a given computing device participating in a replication session, according to one embodiment.

FIG. 6 illustrates a method 600 for capturing and recording user input events on a given computing device participating in a replication session, according to one embodiment. The steps of method 600 may be performed while a replication session is active on a computing device. While active, user input events directed to the app under test on one computing device are captured and broadcast to other computing devices participating in a replication session. Also note, the steps of method 600 may be performed independently by the device agent on each mobile device participating in the replication session.

As shown, the method 600 begins at step 610, where the event capture component receives notification or detects the occurrence of a user input event on a computing device participating in a replication session. At step 610, if the event is captured by the AS recorder (e.g., a tap event for a native user interface components such as a button or text input to a native interface component such as a text box), then at step 615, the event capture component 208 may identify a user interface element associated with the event. At step 620, the event capture component may generate a replication event based on the gesture performed by user and the user interface element, as identified in the notification received from the accessibility service. At step 625, the event capture component sends the replication event to the host agent along with image data and any performance metrics associated with the event as it occurred on the computing device.

Otherwise, in cases where the event notification received at step 605 is related to an event detected by the native recorder, then at step 635, the native recorder may identify a screen region and associated context for the event (e.g., a screenshot and a state of a user interface element prior to the occurrence of the event). At step 640, the native recorder may read a set of low-level hardware events associated with the user input event. The low-level hardware events may be classified as a given user input motion, gesture or activity using a gesture classifier. For example, assume the native recorder reads a sequence of screen touch events which have occurred while a test engineer interacts with an app under test on a computing device. In such a case, the gesture classifier could classify the hardware events as an instance of a swipe event or a flick event performed on a touch screen of a computing device. Once the event type is classified from the low-level hardware events, the event capture component sends a replication event, screenshots, and context data reflecting the user input which occurred on the computing device to the host agent for replication on the other devices participating in the replication session (step 645). Following step 625 or 645, the method 600 returns to step 605 to monitor for and capture the next user input event.

Figure 7:
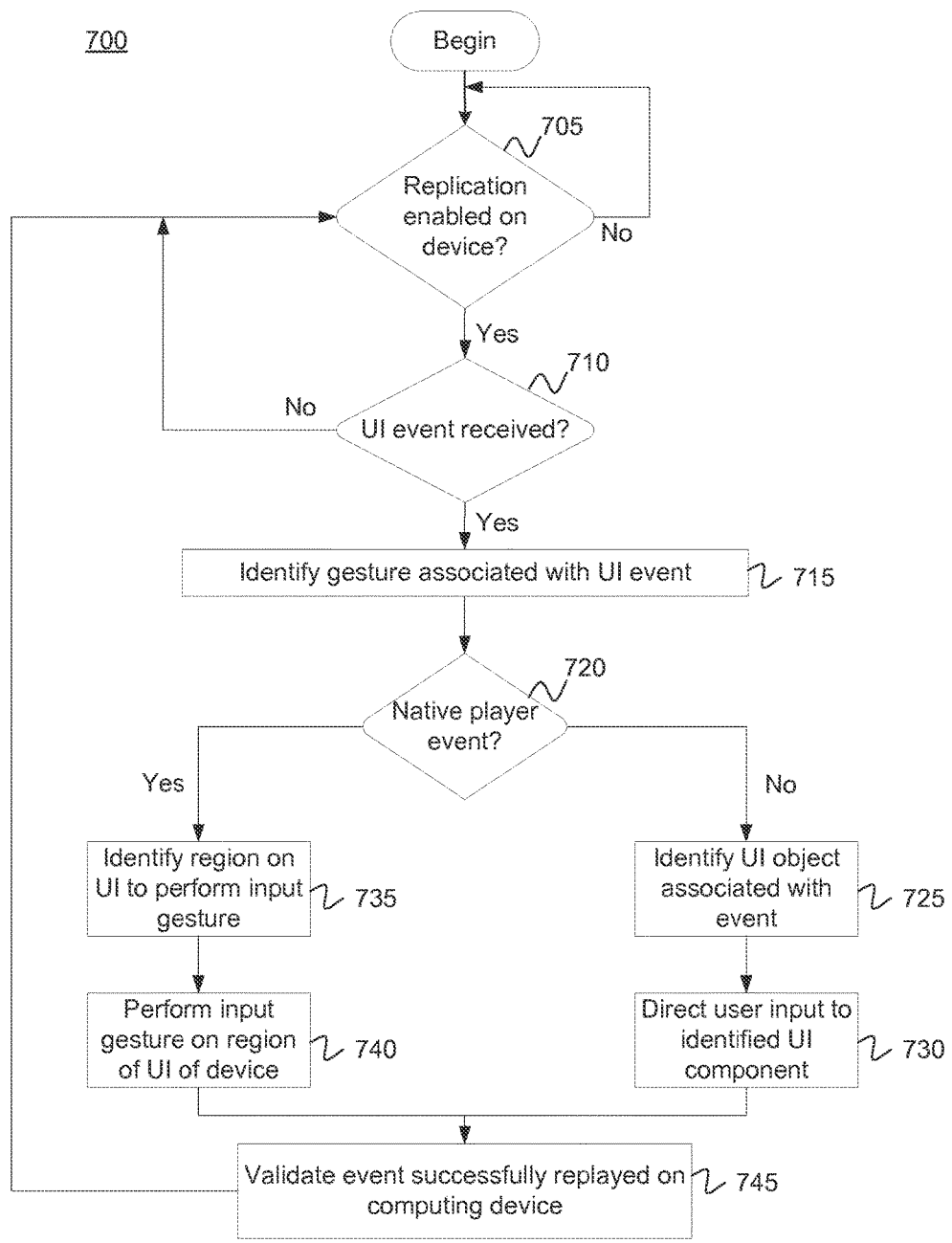
FIG. 7 illustrates a method for a computing device participating in a replication session to receive and replicate user input events performed on other computing devices, according to one embodiment.

FIG. 7 illustrates a method 700 for a computing device participating in a replication session to receive and replicate user input events performed on other computing devices, according to one embodiment. As shown, the method 700 begins at step 705, where the device agent on a computing device joined with a replication session determines whether replication is currently enabled on that device. As noted above, a test engineer may toggle whether replication is active on a computing device. Doing so may allow the test engineer to interact with one of the computing devices during a replication session as needed without triggering events replayed on other devices or replaying events received from other devices.

Provided event replication is active, the device agent waits until a UI event is received from the host agent to be replayed on the computing device (step 710). Once an event is received, the device agent identifies a gesture (or other action) associated with the UI event (step 715) to be replayed and directed to the app under test. For example, the event may correspond to a gesture performed on another one of the computing devices participating in a replication session or a system event on the event originating device such as a screen orientation change.

In one embodiment, the event player component of the device agent may be configured to replay events captured by an AS recorder or a native recorder. In such an embodiment, the event player determines whether the replication event received at step 710 was captured by the native recorder or the AS recorder (step 720). If captured by the native recorder, then at step 735, the event player identifies a region on the user interface of the target device to perform the input gesture associated with the replication event received at step 710. For example, in one embodiment, the event player may compare a screenshot of the current user interface present on the computing device replaying an event with a corresponding screenshot of the app captured on event originating device. Doing so allows the device agent to determine a region on the screen of the target device to direct a user input gesture to (or where to direct other events being replayed). Further, as noted above, the event player may normalize or format a gesture performed on one device to account for differences in screen size, text settings, component position, etc., on the computing device replaying the event. At step 740, the event player generates a user input event directed to the app under test on the computing device replaying the event (i.e., the target device).

Returning to step 720, if the event received at step 710 was captured by the AS recorder on the event originating device, then at step 725, the event player identifies a user interface object associated with the event. For example, the event player may determine a native user interface component based on the view hierarchy and layout of user interface components on the event originating device and find a matching component on a view hierarchy and layout of user interface components on the computing device replaying the event (i.e., the target device). At step 730, the event player directs a user input event to the interface component identified at step 725.

Following step 730 or 750, the event player validates whether the event was successfully replayed on the computing device. In addition, the event player may update the host agent with a screenshot of the application under test both preceding and following a replay of the event received at step 710 along with any appropriate metadata or preface metrics generated during event replication.

Figure 8:
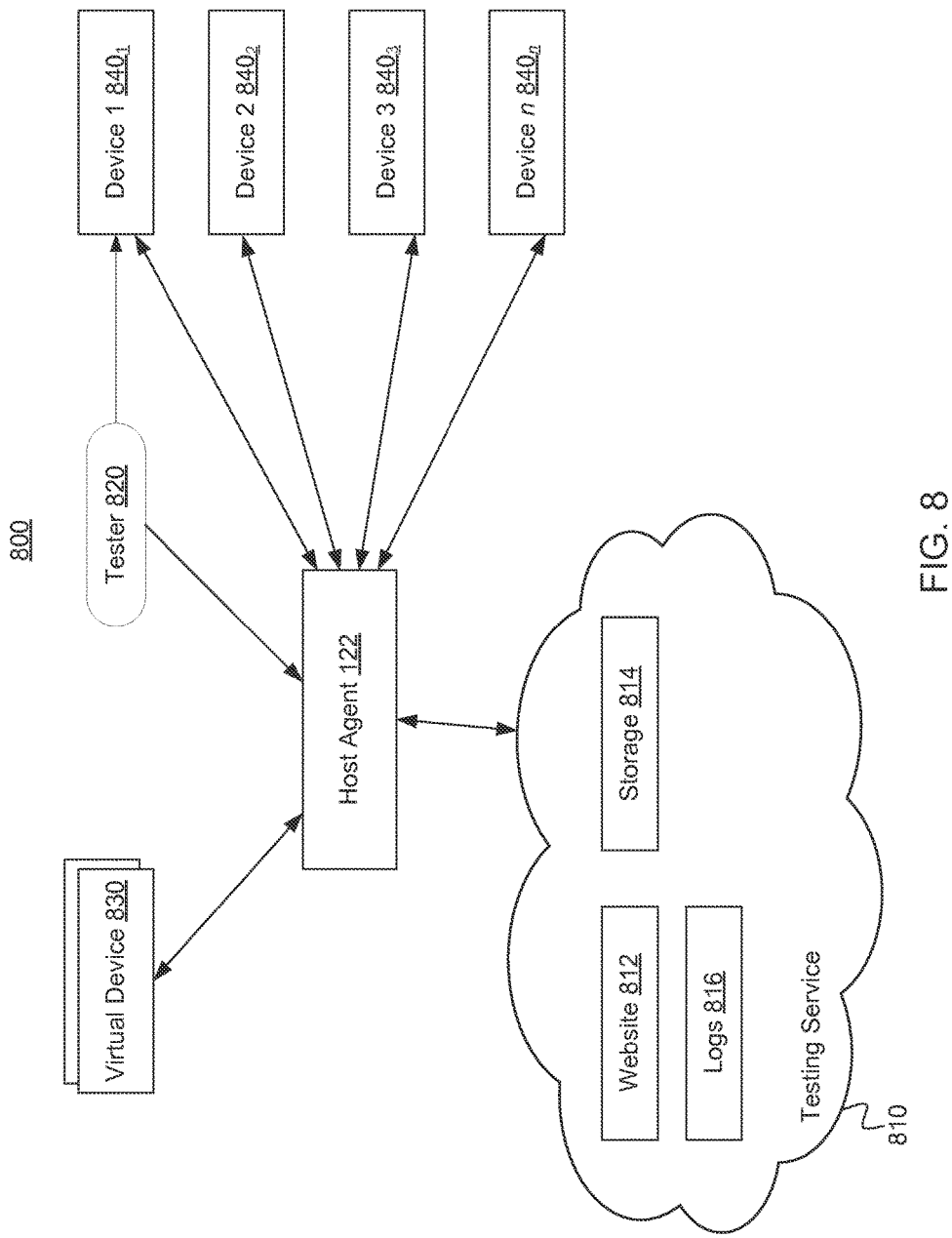
FIG. 8 illustrates a cloud based service used to provide a tool to replicate actions across devices in real time for improved efficiency during application testing, according to one embodiment.

FIG. 8 illustrates a computing environment 800 which includes a cloud based service 810 used to provide a tool to replicate actions across devices in real time for improved efficiency during application testing, according to one embodiment. As described above, a test engineer (e.g., tester 820) may interact with a host agent 122 and a set of computing devices (e.g., devices $840_{1-n}$ to test an application across multiple devices or device configurations in real time. Further, in one embodiment, a cloud-based testing service 810 may be used to capture performance data, screenshots, and other metadata generated while the tester 820 interacts with an app under test on devices $840_{1-n}$. For example, as the devices $840_{1-n}$ upload test artifacts to the host agent 122, the host agent 122 may store this information at a cloud based storage service 814 exposed by the test service 810. Further, after the tester 820 evaluates a given app, data related to the performance of that app captured in storage 814 may be used to provide feedback to a developer. For example, the tester 820 and developer could be provided with access to website 812 in order supply, access, or discuss test feedback and test data generated during app testing and made available in storage 814 and logs 816.

In one embodiment, logs 816 may store batches of events captured during a test session for a given app tested by tester 820. Further, in addition to storing data generated during a test and replication session, logs 816 may be used to automate the application testing process. For example, the host agent 122 may send the testing service 810 data representing each replay event captured by the device agents on devices $840_{1-n}$ for an app under test. The test service 810 may store replay events in logs 816 as a batch sequence which may be repeated on a given one of the devices $840_{1-n}$. For example, assume tester 820 provides manual user input to devices $840_1$ and $840_2$, which are then replayed on device $840_3$ and $840_n$. In such a case, a complete sequence of events occurring during the replication session may be stored as a separate batch sequence for each device $840_{1-n}$. That is, the batch sequences in logs 816 may be used to provide batch test for each app and device combination present in the replication session (devices $840_{1-n}$ in this example). As another example, assume a test engineer identifies flaws or errors in an app during testing and provides a developer with feedback, screenshots, and other information generated while testing the app. In response, the developer could revise and resubmit the app for further testing and evaluation. Rather than test the revised app manually on devices $840_{1-n}$, in one embodiment, the tester 820 can simply replay the same sequence of events stored in logs 816 for a given and app and device combination that was captured while the device was evaluated during the initial testing process. In addition to recording a raw batch sequence of events, in one embodiment, the host agent 122 (or other software tool) may generate other tests from the recorded batch sequence using any suitable app testing framework. Accordingly, a recorded batch sequence could be used to generate tests which are composed according to a variety of test frameworks or software tools, including, e.g., UIAutomator, Robotium, Instrumentation, Appium, Cucumber, etc.

Further, logs 816 may be used to automate testing of a given app and device as new versions of the app are released or new releases of a device operating system or device become available. For example, following an update of an OS or device, a log 816 may provide a sequence of replay events which may be appropriate for testing a given app on the updated OS or device. Further still, the testing service may support virtual devices 830. In one embodiment, each virtual device may emulate a computing device having a given hardware and operating system profile. The virtual devices 830 may be used to complement the testing of an app on devices 840$_{1-n}$. For example, in some cases, the tester 820 may elect to test an app on a set of hardware devices and configurations expected to include the app under test. In addition, the virtual devices 130 may perform a batch sequence of replay events captured for a given app and device on a much larger variety of devices or device configurations, e.g., for older or discontinued versions of a computing device, unusual or unlikely configurations of the device, etc.

In another embodiment, a batch sequence of replay events may be used to test different custom instances of an app based on a common template. For example, consider an app used to retrieve and display securities and other regulatory filings for a given enterprise. In such a case, an app template may be designed to allow users to view the specific filings made by a given enterprise, and the user interface components, views, and navigation controls may be the same for different custom instances of the app based on the common template. For example, each instance may include common elements (e.g., a text input box for searching regulatory filings, user interface elements to present a list of regulatory filings, controls to navigate search results or lists of documents, etc.). Such an app could be customized for a given enterprise, e.g., to display a logo and graphics for a given enterprise and the actual content of the regulatory filings. As another example, some gaming or social media apps may be based on a common template, but use different graphics or display text for user interface components or 3D graphics data. In such cases, provided the underlying interface structure of a template is common to each instance of the app based on the common template, a batch sequence captured using one instance may be replayed on any other instance.

Figure 9:
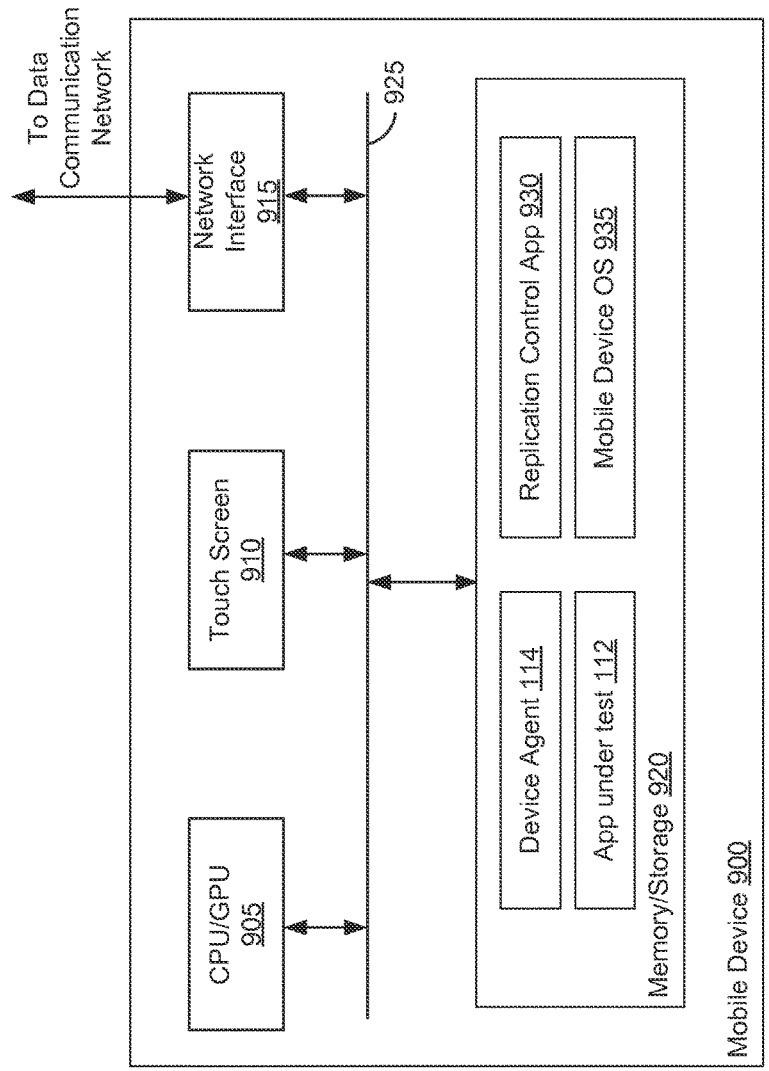
FIG. 9 illustrates an example mobile computing device used to host the device agent first shown in FIG. 2, according to one embodiment.

FIG. 9 illustrates an example computing device 900 used to host the device agent 114 first shown in FIG. 2, according to one embodiment. In this example, computing device 900 is included to be representative of a mobile telephone or computing tablet which includes a touch sensitive display 910. Of course, embodiments of the invention may be adapted for use with a variety of computing devices, including, video game consoles, streaming media devices, and other computing devices which can download and install apps hosted by an online distribution service or "app store."

As shown, the computing device 900 includes a central processing unit and graphics processing unit (CPU/GPU) 905, network or radio interfaces 915, each connected to memory and storage components 920. Of course, an actual handheld device is expected to include a variety of additional hardware components. The CPU/GPU 905 retrieves and executes programming instructions stored in the memory and storage components 920. An interconnect 925 is used to transmit instructions and data between the CPU/GPU 905, memory and storage components 920, network interfaces 915. CPU/GPU 905 is included to be representative of a single CPU, multiple CPUs, a single CPU having multiple processing cores and a GPU used to render graphics data presented on display screen 910 of computing device 900. The memory and storage components 920 are generally included to be representative of storage subsystems found on mobile computing devices, e.g., DDR and flash memory modules.

Illustratively, the memory and storage components 920 include a mobile device OS 935, a replication control app 930, a device agent 114, and an app under test 112. The mobile OS 935 provides system software used to manage the hardware components on device 900 and the execution of application programs on the computing device 900. The mobile OS 935 may also provide or expose a variety of services to such applications. For example, as described above, the device agent 114 may read low-level hardware events published by the mobile OS 935 generated while a test engineer interacts with the computing device 900 as well as invoke a gesture recognition API to convert the low-level hardware events into gestures or other user inputs directed to app 112 under test. Similarly, the mobile OS 935 may host an accessibility service which receives notifications of events related to transitions or events for user interface elements of the applications executed on the computing device 900. The replication control app 930 may be used to start or stop replication actions performed by the device agent 114. As described above, the device agent 114 may provide an on-device daemon installed on the computing device 900 which captures, logs, and replays user input events for an app 112 under test as part of a given replication session.

Figure 10:
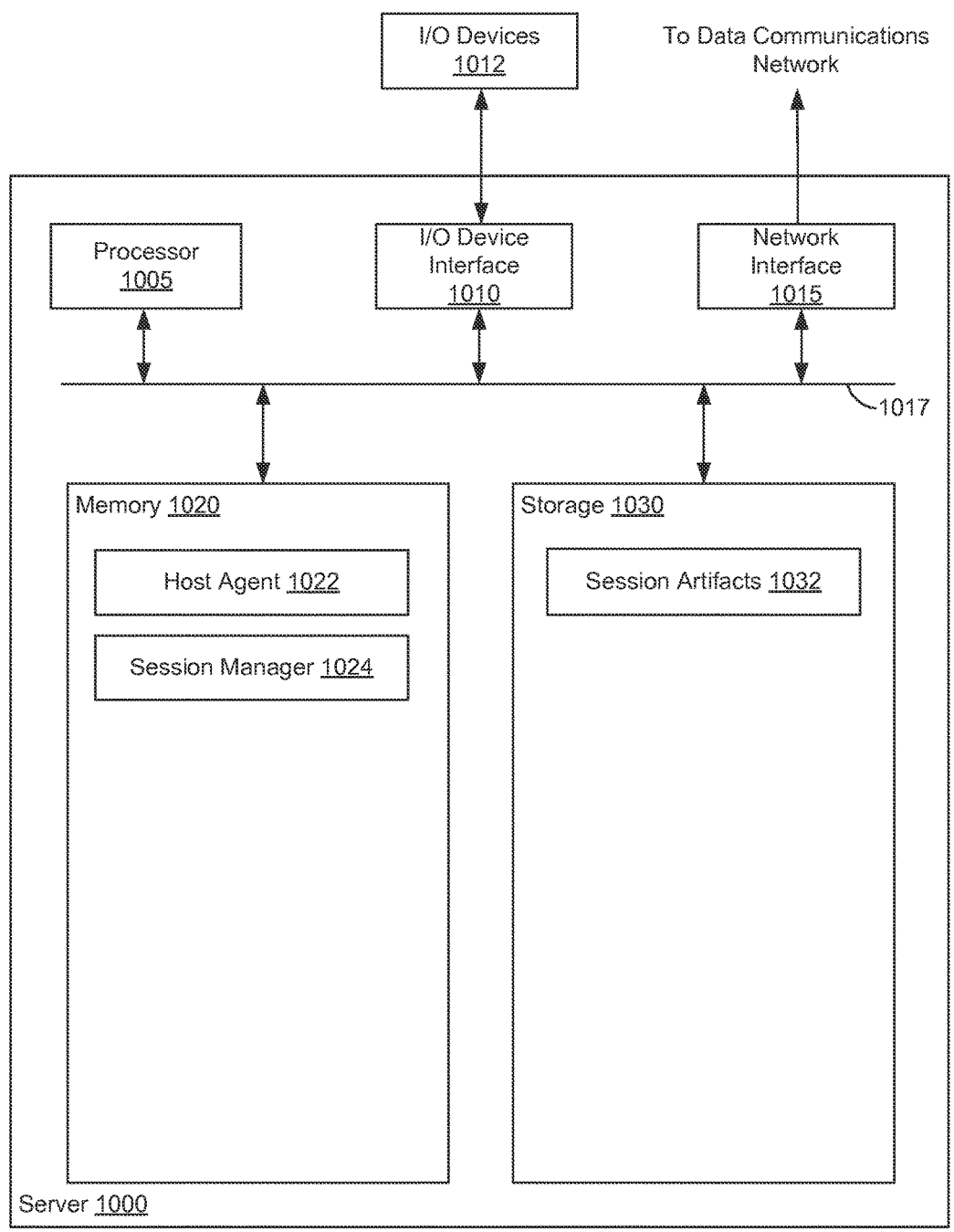
FIG. 10 illustrates an example computing system used to manage a replication session on a collection of mobile computing devices, according to one embodiment.

FIG. 10 illustrates an example computing system 1000 which includes a host agent and test platform used to replicate user input events performed on one device to other devices as part of application testing, according to one embodiment. As shown, the computing system 1000 includes, without limitation, a central processing unit (CPU) 1005, a network interface 1015, a memory 1020, and storage 1030, each connected to a bus 1017. The computing system 1000 may also include I/O device interface 1010 connecting I/O devices 1012 (e.g., keyboard, display and mouse devices) to the computing system 1000. Further, in context of this disclosure, the computing elements shown in computing system 1000 may correspond to a physical computing system a laptop or desktop or a virtual computing instance executing within a computing cloud.

The CPU 1005 retrieves and executes programming instructions stored in the memory 1020 as well as stored in the storage 1030. The interconnect 1017 is used to transmit programming instructions and application data between the CPU 1005, I/O devices interface 1010, storage 1030, network interface 1015, and memory 1020. Note, CPU 1005 is included to be representative of a single CPU, multiple CPUs, a single CPU having multiple processing cores, and the like, and the memory 1020 is generally included to be representative of a random access memory. The storage 1030 may be a disk drive or flash storage device. Although shown as a single unit, the storage 1030 may be a combination of fixed and/or removable storage devices, such as fixed disc drives, removable memory cards, optical storage, network attached storage (NAS), or a storage area-network (SAN).

Illustratively, the memory 1020 includes a host agent 1022, and a session manager 1024, and storage 1030 includes a collection of session artifacts 1032 (such as screenshots, event logs, performance metrics, tags or comments from a test engineer). As described, the host agent 1022 may generally allow a test engineer to control a replication session. For example the host agent 1022 may allow the test engineer to join (or remove) computing devices to a replication session. In addition, the host agent 1022 may receive user input events captured on one of the computing devices participating in a replication session and broadcast such events for replication to other devices participating in the replication session. The host agent 1022 may also capture the events which occur during the replication session, allowing batch events to be generated for a given device and app combination. Doing so allows the replication session to replay a batch sequence of events which occurred on a given app during testing for different devices or device configurations, including virtualized devices. Similarly, the batch sequences may be used to test different versions of an app, device, or mobile operation system, such as new releases or versions thereof.

Advantageously, embodiments described above provide an effective and efficient tool for dynamically testing an app on multiple computing devices in real time. Further, because the device agent may rely on services provided by the device OS to identify and translate user input events, the platform does not require special privileges or access to a device under test, does not require any modification of the app being tested or simulated, and high accuracy for event replication and broad event coverage (i.e., the range of user input that can be replicated), as well as accurately tests the performance of an app on multiple devices. In addition, the platform does not require any one particular device participating in a replication session to act as a "master" or "lead" device. Instead, events input by a test engineer to any of computing devices participating in a replication session are replicated to all the other devices in that session.

Note, the above descriptions of embodiments of the present invention have been presented for purposes of illustration, but are not intended to be limited to the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable storage medium storing instructions, which when executed on one or more processing devices, perform an operation for dynamically testing a first application installed on a first computing device in a collection of computing devices and a second application installed on a second computing device in the collection of computing devices, wherein the first computing device includes at least one of software and hardware different from the second computing device, the operation comprising:

monitoring, by a device agent on the first computing device, for an occurrence of one or more input events; and after the occurrence of a first user input event associated with the first application on the first computing device:
determining an event type corresponding to the first user input event,
identifying a first user interface element associated with the first application to which the first user input event was directed,
generating a replication event used to perform the first user input event on the second computing device,
transmitting the replication event to a host agent managing a replication session for the collection of computing devices, wherein the host agent broadcasts the replication event to the second computing device in the collection of computing devices,
receiving, by a device agent on the second computing device, the replication event,
identifying, on the second computing device, the event type corresponding to the first user input event,
identifying, on the second computing device, a second user interface element associated with the second application on the second computing device, and
performing the replication event by generating user input directed to the second user interface element, wherein information associated with performing the replicated event on the second computing device is captured.

2. The computer-readable storage medium of claim 1, wherein the operation further comprises:

validating whether the user input directed to the second user interface element associated with the second application was replayed successfully.

3. The computer-readable storage medium of claim 1, wherein the device agent on the second computing device captures one or more screenshots of the second user interface element on the second computing device while replaying the replication event.

4. The computer-readable storage medium of claim 1, wherein detecting the occurrence of the first user input event comprises:
   receiving a notification from a service exposed by an operating system on the first computing device that the first user interface element associated with the first application has transitioned from a first state to a second state.

5. The computer-readable storage medium of claim 1, wherein detecting the occurrence of the first user input event comprises:
   accessing hardware events generated by input components of the first computing device and published by an operating system on the first computing device; and
   determining the event type based on at least the hardware events.

6. The computer-readable storage medium of claim 1, wherein the operation further comprises:
   capturing a first screenshot of the first user interface element in a state preceding the first user input event; and
   capturing a second screenshot of the first user interface element in a state following the user input event.

7. The computer-readable storage medium of claim 1, wherein the wherein the event type is a gesture performed on a touch screen display on the first computing device.

8. A computing system, comprising:
   a processor; and
   memory containing instructions which, when executed on the processor, perform an operation for dynamically testing a first application installed on a first computing device in a collection of computing devices and a second application installed on a second computing device in the collection of computing devices, wherein first computing device includes at least one of software and hardware different from the second computing device, the operation comprising:
      monitoring, by a device agent on the first computing device, for an occurrence of one or more input events; and
      after the occurrence of a first user input event associated with the first application on the first computing device:
         determining an event type corresponding to the first user input event,
         identifying a first user interface element associated with the first application to which the first user input event was directed,
         generating a replication event used to perform the first user input event on the second computing device,
         transmitting the replication event to a host agent managing a replication session for the collection of computing devices, wherein the host agent broadcasts the replication event to the second computing device in the collection of computing devices,
         receiving, by a device agent on the second computing device, the replication event,
         identifying, on the second computing device, the event type corresponding to the first user input event,
         identifying, on the second computing device, a second user interface element associated with the second application on the second computing device, and
         performing the replication event by generating user input directed to the second user interface element, wherein information associated with performing the replicated event on the second computing device is captured.

9. The computing system of claim 8, wherein the operation further comprises:
   validating whether the user input directed to the second user interface element associated with the second application was replayed successfully.

10. The computing system of claim 8, wherein the device agent on the second computing device captures one or more screenshots of the second user interface element on the second computing device while replaying the replication event.

11. The computing system of claim 8, wherein detecting the occurrence of the first user input event comprises:
   receiving a notification from a service exposed by an operating system on the first computing device that the first user interface element associated with the first application has transitioned from a first state to a second state.

12. The computing system of claim 8, wherein detecting the occurrence of the first user input event comprises:
   accessing hardware events generated by input components of the first computing device and published by an operating system on the first computing device; and
   determining the event type based on at least the hardware events.

13. The computing system of claim 8, wherein the operation further comprises:
   capturing a first screenshot of the first user interface element in a state preceding the first user input event; and
   capturing a second screenshot of the first user interface in a state following the user input event.

14. The computing system of claim 8, wherein the wherein the event type is a gesture performed on a touch screen display on the first computing device.

15. A method for dynamically testing a first application installed on a first computing device in a collection of computing devices and a second application installed on a second computing device in the collection of computing devices, wherein first computing device includes at least one of software and hardware different from the second computing device, the method comprising:
   monitoring, by a device agent on the first computing device, for an occurrence of one or more input events; and
   after the occurrence of a first user input event associated with the first application on the first computing device:
      determining an event type corresponding to the first user input event,
      identifying a first user interface element associated with the first application to which the first user input event was directed,
      generating a replication event used to perform the first user input event on the second computing device,
      transmitting the replication event to a host agent managing a replication session for the collection of computing devices, wherein the host agent broadcasts the replication event to the second computing device in the collection of computing devices, receiving, by a device agent on the second computing device, the replication event, identifying, on the second computing device, the event type corresponding to the first user input event, identifying, on the second computing device, a second user interface element associated with the second application on the second computing device, and performing the replication event by generating user input directed to the second user interface element, wherein information associated with performing the replicated event on the second computing device is captured.

16. The method of claim 15, further comprising:

validating whether the user input directed to the second user interface element associated with the second application was replayed successfully.

17. The method of claim 15, wherein the device agent on the second computing device captures one or more screenshots of the second user interface element on the second computing device while replaying the replication event.

18. The method of claim 15, wherein detecting the occurrence of the first user input event comprises:

receiving a notification from a service exposed by an operating system on the first computing device that the first user interface element associated with the first application has transitioned from a first state to a second state.

19. The method of claim 15, wherein detecting the occurrence of the first user input event comprises:

accessing hardware events generated by input components of the first computing device and published by an operating system on the first computing device; and determining the event type based on at least the hardware events.

20. The method of claim 15, further comprising:

capturing a first screenshot of the first user interface element in a state preceding the first user input event; and capturing a second screenshot of the first user interface element in a state following the user input event.

\* \* \* \* \*

UNITED STATES PATENT AND TRADEMARK OFFICE
CERTIFICATE OF CORRECTION

PATENT NO. : 9,747,191 B1
APPLICATION NO. : 14/875471
DATED : August 29, 2017
INVENTOR(S) : Faizaan Kersi Marolia et al.

Page 1 of 1

It is certified that error appears in the above-identified patent and that said Letters Patent is hereby corrected as shown below:

On the Title Page

In item (72), in Column 1, in "Inventors", Line 4, delete "Bengalaru" and insert -- Bangalore --, therefor.

In the Claims

In Column 17, Line 33, in Claim 7, delete "wherein the wherein the" and insert -- wherein the --, therefor.

Signed and Sealed this
Twenty-first Day of November, 2017

Joseph Matal
*Performing the Functions and Duties of the
Under Secretary of Commerce for Intellectual Property and
Director of the United States Patent and Trademark Office*